United States Patent Office 2,824,852
Patented Feb. 25, 1958

2,824,852

CURED MIXTURE OF POLYMERIC 2-CYANO-ETHYL ACRYLATE AND A POLYMERIC CYANO ETHER ESTER AND PROCESS OF PREPARING THE SAME

Roland J. Kern, Miamisburg, Ohio, assignor to Monsanto Chemical Company, St. Louis, Mo., a corporation of Delaware No Drawing. Application August 18, 1955
Serial No. 529,312

6 Claims. (Cl. 260—45.5)

The present invention relates to elastomeric materials and more particularly deals with the manufacture of elastomers from certain cyano ether acrylates and to the cured, rubbery products thus obtained.

It is known that certain cyano ether acrylates polymerize to give rubbery materials of very good solvent resistance. Thus, in the Mowry et al. U. S. Patent No. 2,669,558, there is disclosed polymeric (cyanoethoxy)-ethyl acrylate and in the Butler application, Serial No. 337,241, filed February 16, 1953, which issued as U. S. Patent No. 2,720,512, dated October 11, 1955, there are disclosed polymeric (cyanoethoxy)propyl and (cyanoethoxy)butyl acrylate. Both also disclose rubbery polymers of like compounds having a plurality of ethoxy groups.

In the conversion of these polymers to give cured rubbers, only a very low rate of cure is attainable when working in conventional metal oxide curing systems. Thus, even after several hours at 165° C. and a pressure of 500 p. s. i., the Shore hardness of a mill roll stock of polymeric 2-(2-cyanoethoxy)ethyl acrylate in a recipe comprising stearic acid and lead and magnesium oxides, the cured product is still flabby. The long curing time not only fails to bring about the formation of desirably cured products, but also often leads to scorching and decomposition of the polymer. The present invention provides improved rubbers by curing certain polymeric cyano ether acrylates in admixture with a minor proportion of polymeric 2-cyanoethyl acrylate.

The polymeric cyano ether esters which are presently employed are homopolymers of cyano ether acrylates of the formula

in which R, R', R" and R''' are selected from the class consisting of hydrogen and the methyl radical and $n$ is an integer of 1 to 3.

Compounds having the above formula and useful for the present purpose are 2-(2-cyanoethoxy)ethyl acrylate, 2-(2-cyanopropoxy)ethyl acrylate, 2-[2-(2-cyanoethoxy)-ethoxy]ethyl acrylate, 2-(2-cyanoethoxy)-1-methylethyl acrylate, 4-(2-cyanoethoxy)butyl acrylate, 3-(2-cyanoethoxy)propyl acrylate, 4-[2-(2-cyanoethoxy)ethoxy]-butyl acrylate, the ester obtained from acrylic acid and the addition product of acrylonitrile with tripropylene glycol, etc. As disclosed in the Mowry patent and the Butler application referred to above, these cyano ether esters are readily prepared by the addition reaction of acrylic acid and the appropriate (hydroxyalkoxy)alkanecarbonitrile. The hydroxy nitriles are obtainable by the addition of, e. g., acrylonitrile and a glycol or polyglycol such as ethylene glycol or triethylene glycol.

The ratio of polymeric cyano ether acrylate to the polymeric cyano ethyl acrylate which I use in preparing the new cured rubbers varies with the nature of the individual cyano ether esters and of the metal oxides used as well as with the temperature and pressure conditions employed in the curing step. Generally, as little as, say, 5 parts by weight of the polymeric cyano ethyl acrylate per 100 parts of the polymeric cyano ether acrylate results in increased curing rate and the production of cured products which are substantially better cured than those obtained from the polymeric cyano ether acrylate in absence of the cyanoethyl polymer. The curing rate of the cured product increases with increasing content of the cyanoalkyl acrylate in the stock. The recommended composition of the polymer mixture employed in the curing stock is from 50 to 90 parts by weight of the cyano ether ester and from 10 to 50 parts by weight of the cyanoethyl acrylate. Those skilled in the art, having had the benefit of the present disclosure, can readily determine by simple tests, suitable quantities of the cyanoethyl acrylate for a particular cyano ether acrylate in a given metal oxide system.

For some purposes, particularly when it is desired to prepare cured, rubbery products having both good low temperature flexibility and good solvent resistant properties, it may be desirable to employ, as the cyano ether ester constituent of the stock, a mixture of two different polymers, e. g., a mixture of 2-(2-cyano)ethoxyethyl acrylate with 4-(2-cyanoethoxy)butyl acrylate or with the ester of acrylic acid and the addition product of methacrylonitrile and diethylene glycol. For purposes of simplicity, the term "cyano ether acrylate" as used in the present specification and claims denotes either a single cyano ether acrylate of the formula shown above or a mixture of two or more of said acrylates, either as a mixture of two or more of the homopolymers or a copolymer of two different cyano ether esters.

In addition to the cyano ether acrylate and the cyanoalkyl acrylate, there is present in the stock which is to be cured the components conventionally present in metal oxide curing systems, i. e., one or more metal oxides and a weak organic acid, e. g., a higher paraffinic acid such as stearic acid or lauric acid. Metal oxides which are generally used in the art in the formulation of curing recipes and which are useful for the present purpose are, e. g., the lead oxides such as lead monoxide, lead dioxide and red lead oxide ($Pb_3O_4$), magnesium oxide, aluminum oxide, zinc oxide, barium oxide, calcium oxide, ferrous oxide, ferric oxide, cadmium oxide, mercuric oxide, etc. Oxides of the metals of groups II, III, IV and VIII of the periodic system are generally useful. Usually, the curing recipe comprises a mixture of a di- or trivalent metal oxide and a reducible metal oxide. Or, there maybe employed a single oxide, which, during the curing process may serve in two capacities, i. e., as the di- or trivalent oxide and as the reducible metal oxide, e. g., lead dioxide. As herein employed, the term "metal oxide" includes compounds of said metals with varying proportions of oxygen, i. e., the metal monoxides, dioxides or peroxides, and suboxides.

The curing conditions employed are also generally those employed in the art with metal oxide curing systems, i. e., heating at, say, temperatures of from 100° C. to 200° C. and at pressures of from, say, atmospheric to 1000 p. s. i. or higher. The curing time will generally range from, say, 15 minutes to 2 hours. The temperature, presusre and time for obtaining cured products of the desired hardness, modulus and other physical characteristics will be easily determined by those skilled in the art of curing rubbery polymeric materials. It will be found that under like temperature and pressure conditions and in like systems, the curing time of a polymeric cyano ether ester is decreased when said ester is admixed with a minor proportion of a cyanoalkyl acrylate.

The rubbery products which are prepared according to the invention are generally useful as flexible molded pieces, e. g., gaskets, tubes and housings. Because of their resistance to solvents and their tolerance to heat and cold, they are particularly valuable in the manufacture of parts for aircraft.

The invention is further illustrated, but not limited, by the following example:

*Example*

The curing speed of polymeric 2-(2-cyanoethoxy)ethyl acrylate in admixture with polymeric 2-cyanoethyl acrylate was compared with the curing speed of polymeric 2-(2-cyanoethoxy)ethyl acrylate in the absence of any other polymer.

The following stocks were respectively compounded on cold mill rolls:

Stock I:
  100 parts polymeric 2-(2-cyanoethoxy)ethyl acrylate
  20 parts magnesium oxide
  3 parts stearic acid
  5 parts lead dioxide Stock II:
  28 parts polymeric 2-cyanoethyl acrylate
  5.7 parts magnesium oxide
  1.14 parts lead dioxide
  0.86 part stearic acid Stock III:
  20 parts of stock I
  4 parts of stock II The above quantities are parts by weight. In stock III there was present 15.6 parts of polymeric 2-(2-cyanoethoxy)ethyl acrylate and 3 parts of polymeric 2-cyanoethyl acrylate, i. e., the two polymers were present in about 5:1 ratio.

Each of stocks I and III were cured for 90 minutes at a pressure of 500 p. s. i. and full steam pressure, giving a temperature of 165° C.–170° C. The Shore hardness of the cured stock I was found to be 16 and that of the cured stock III was found to be 30. When stock I was cured for 190 minutes at 165° C. and a pressure of 500 p. s. i., the cured product was still somewhat flabby and was found to have a Shore hardness of only 20.

The use of other of the present polymeric cyano ether esters with polymeric 2-cyanoethyl acrylate likewise results in short curing times. Thus, instead of the mixture of cyano ether ester and cyanoethyl ester used above, cured elastomers are obtained by the present process from, e. g., mixtures of 2-cyanoethyl acrylate with 2-(2-cyanoethoxy) - 1 - methylethyl acrylate, 3-(2-cyanopropoxy) - propyl acrylate or 4-(2-cyanoethoxy) butyl acrylate, etc.

Although in the above example, the cyano ether ester and the cyanoalkyl ester were respectively compounded, and the compounded materials were then admixed for the preparation of a test stock containing both the cyano ether ester and the cyanoalkyl ester, this procedure being employed in order that both a single polymer-containing stock and the mixed stocks be tested, it will be obvious that such separate compounding is unnecessary. In practical operation the two ester components are simply mixed together with the metal oxide or oxides and the organic acid.

What is claimed is:

1. A rubbery product comprising a metal oxide cured mixture of polymeric 2-cyanoethyl acrylate and a polymeric cyano ether ester having the formula:

$$CH_2{:}CH.COO(\overset{R}{\underset{|}{C}H})_n(\overset{R'}{\underset{|}{C}}H O \overset{R''}{\underset{|}{C}}H)_n\overset{R'''}{\underset{|}{C}}HCN$$

in which R, R', R" and R'" are selected from the class consisting of hydrogen and the methyl radical and $n$ is an integer of from 1 to 3, the polymer content of said mixture being from 50 to 90 parts by weight of the polymeric cyano ether ester and from 10 to 50 parts by weight of the polymeric 2-cyanoethyl acrylate, said metal oxide being an oxide of a metal of groups II–IV and VIII of the periodic system and said curing having been conducted at a temperature of from 100° C. to 200° C. and a pressure of from atmospheric to 1,000 p. s. i.

2. A rubbery product comprising a metal oxide cured mixture of polymeric 2-cyanoethyl acrylate and polymeric 2-(2-cyanoethoxy)ethyl acrylate, the polymer content of said mixture being from 50 to 90 parts of the polymeric 2-(2-cyanoethoxy)ethyl acrylate and from 10 to 50 parts by weight of the polymeric 2-cyanoethyl acrylate, said metal oxide being an oxide of a metal of groups II–IV and VIII of the periodic system and said curing having been conducted at a temperature of from 100° C. to 200° C. and a pressure of from atmospheric to 1,000 p. s. i.

3. A rubbery product comprising a lead dioxide-magnesium oxide cured mixture of polymeric 2-(2-cyanoethoxy)ethyl acrylate and polymeric 2-cyanoethyl acrylate, the polymer content of said mixture being from 50 to 90 parts by weight of the polymeric 2-(2-cyanoethoxy)ethyl acrylate and from 10 to 50 parts by weight of the polymeric 2-cyanoethyl acrylate, and said curing having been conducted at a temperature of from 100° C. to 200° C. and at a pressure of from atmospheric to 1,000 p. s. i.

4. The method of preparing a rubbery product which comprises curing, at a temperature of from 100° C. to 200° C. and at a pressure of from atmospheric to 1,000 p. s. i., in a metal oxide curing system comprising an oxide of a metal of groups II–IV and VIII of the periodic system, a mixture of polymers consisting of polymeric 2-cyanoethyl acrylate and a polymeric cyano ether ester having the formula:

$$CH_2{:}CH.COO(\overset{R}{\underset{|}{C}H})_n(\overset{R'}{\underset{|}{C}}H O \overset{R''}{\underset{|}{C}}H)_n\overset{R'''}{\underset{|}{C}}HCN$$

in which R, R', R" and R'" are selected from the class consisting of hydrogen and the methyl radical, and $n$ is an integer of from 1 to 3, the polymer content of said mixture being from 50 to 90 parts by weight of the polymeric cyano ether ester and from 10 to 50 parts by weight of the polymeric 2-cyanoethyl acrylate.

5. The method of preparing a rubbery product which comprises curing, at a temperature of from 100° C. to 200° C. and at a pressure of from atmospheric to 1,000 p. s. i. in a metal oxide curing system comprising an oxide of a metal of groups II–IV and VIII of the periodic system, a mixture of polymeric 2-cyanoethyl acrylate and polymeric 2-(2-cyanoethoxy)ethyl acrylate, the polymer content of said mixture being from 50 to 90 parts by weight of the polymeric 2-(2-cyanoethoxy)ethyl acrylate and from 10 to 50 parts by weight of the polymeric 2-cyanoethyl acrylate.

6. The method of preparing a rubbery product which comprises curing, at a temperature of from 100° C. to 200° C. and at a pressure of from atmospheric to 1,000 p. s. i., in a lead dioxide-magnesium oxide curing system, a mixture of polymers consisting of polymeric 2-(2-cyanoethoxy)-ethyl acrylate and polymeric 2-cyanoethyl acrylate, the polymer content of said mixture being from 50 to 90 parts by weight of the polymeric 2-(2-cyanoethoxy)ethyl acrylate and from 10 to 50 parts by weight of the polymeric 2-cyanoethyl acrylate.

References Cited in the file of this patent

UNITED STATES PATENTS

| | | |
|---|---|---|
| 2,467,927 | Ardis | Apr. 19, 1949 |
| 2,669,558 | Mowry et al. | Feb. 16, 1954 |
| 2,720,512 | Butler | Oct. 11, 1955 |